(12) United States Patent
Kishizawa

(10) Patent No.: US 6,418,808 B1
(45) Date of Patent: Jul. 16, 2002

(54) POWER STEERING APPARATUS

(75) Inventor: Yuji Kishizawa, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/522,567

(22) Filed: Mar. 10, 2000

(30) Foreign Application Priority Data

Mar. 12, 1999 (JP) .......................................... 11-067498

(51) Int. Cl.$^7$ ............................................. F16H 35/00
(52) U.S. Cl. ........................ 74/388 PS; 74/396; 74/422
(58) Field of Search .............................. 74/388 PS, 396, 74/406, 422, 395

(56) References Cited

U.S. PATENT DOCUMENTS 2,945,395 A * 7/1960 Ziskal ........................... 74/499
3,753,375 A * 8/1973 Colletti ........................ 74/498
4,724,714 A * 2/1988 Iwasaki et al. ................ 74/396

FOREIGN PATENT DOCUMENTS

| JP | 5820561 | | 2/1983 |
| JP | 58-61346 | * | 4/1983 |
| JP | 5820216 | | 11/1983 |
| JP | 6116035 | | 7/1986 |
| JP | 6137396 | | 5/1994 |

* cited by examiner

Primary Examiner—David Fenstermacher
(74) Attorney, Agent, or Firm—Orum & Roth

(57) ABSTRACT

A power steering apparatus having a rack shaft supported by a gear housing via a rack adapter, where the rack adapter has an outer peripheral supporting portion supportable by the gear housing, and an inner peripheral supporting portion supporting the rack shaft which are positioned so as to be eccentric to each other.

2 Claims, 3 Drawing Sheets

POWER STEERING APPARATUS

BACKGROUND OF THE INVENTION

1. Field of the Invention

The present invention relates to a power steering apparatus.

2. Description of the Related Art

In a conventional power steering apparatus, a rack shaft is supported by a gear housing so as to be linearly movable, and a pinion connected to a steering shaft meshes with rack teeth of the rack shaft. A cap is screwed in the vicinity of a crossing portion of the rack shaft of the gear housing and the pinion, and the rack shaft is supported from its back to the cap by a rack guide backed up via a spring, so that the rack teeth of the rack shaft are forcibly caused to mesh with the pinion.

In the conventional art, however, it is difficult to suitably adjust the spring force of the spring for backing up the rack guide, and steering operation is thereby diminished because of an increase in operation resistance of the rack shaft. Also, there is a constant clearance or gap between the rack guide and the cap. For this reason, when a reaction force which is imparted on a road wheel from a road surface acts on the rack shaft, the rack guide compresses and displaces the spring in the range of the clearance, and the rack guide strikes the cap to generate striking or chattering noises.

SUMMARY OF THE INVENTION

An object of the present invention is to arrange the meshing between rack teeth of a rack shaft and a pinion appropriately with a structure where striking noises are not generated at a rack supporting portion of a power steering apparatus.

The present invention is a power steering apparatus where a rack shaft is supported by a gear housing so as to be linearly movable, and a pinion connected to a steering shaft is caused to mesh with rack teeth of the rack shaft, wherein the rack shaft is supported by the gear housing via a rack adapter. The rack adapter comprises an outer peripheral supporting portion supported by the gear housing and an inner peripheral supporting portion supporting the rack shaft. A supporting center of the inner peripheral supporting portion is positioned to be eccentric with respect to a supporting center of the outer peripheral supporting portion. The mounting angle position of the rack adapter relative to the gear housing about the supporting center of the outer peripheral supporting portion of the pinion adapter is arranged to be adjustable.

BRIEF DESCRIPTION OF THE DRAWINGS

The present invention will be more fully understood from the detailed description given below and from the accompanying drawings which should not be taken to be a limitation on the invention, but are for explanation and understanding only. The drawings

DESCRIPTION OF THE PREFERRED EMBODIMENTS

Figure 1:
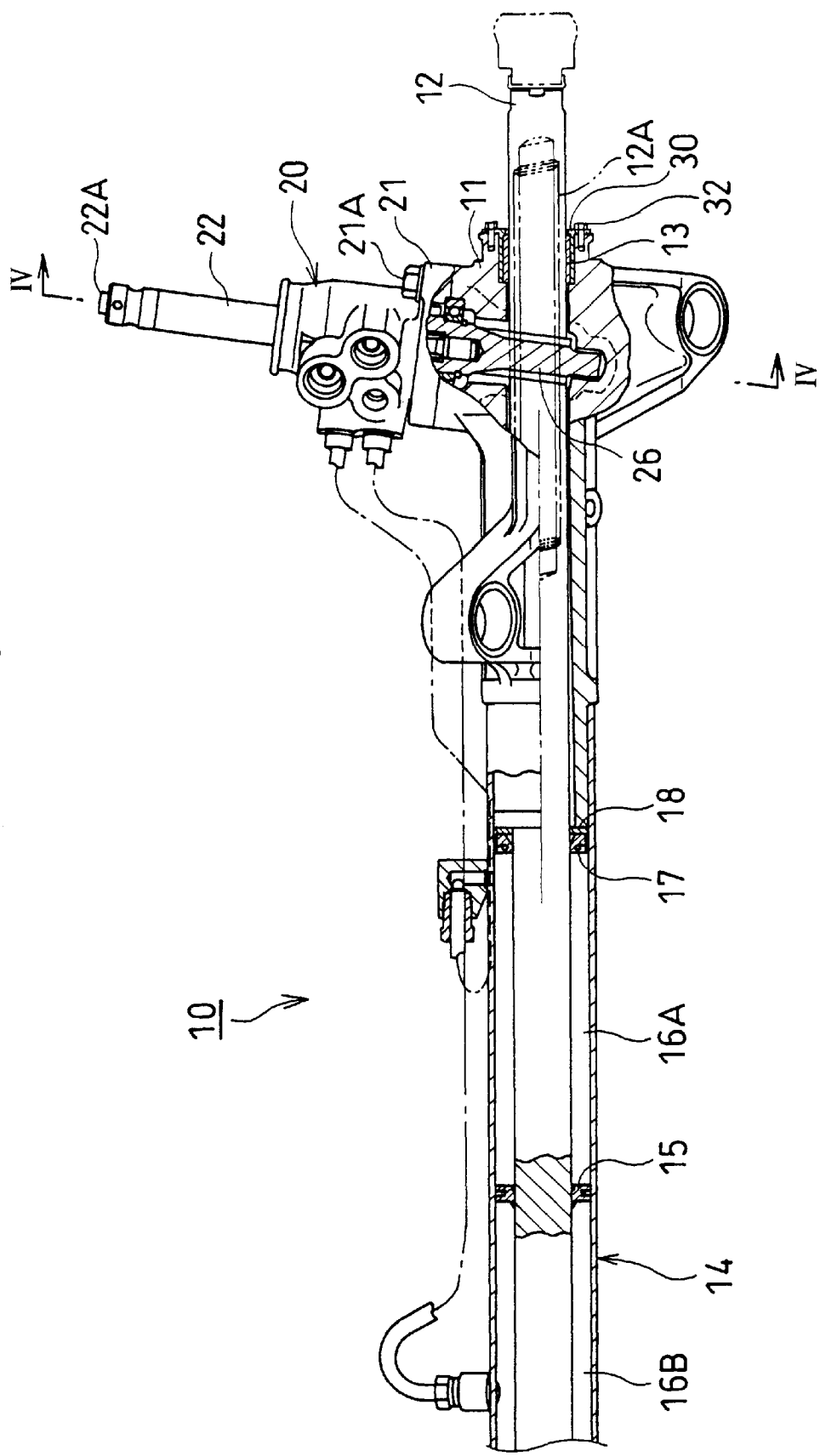
FIG. 1 is partial cutaway side view showing a hydraulic power steering apparatus.
Figure 2:
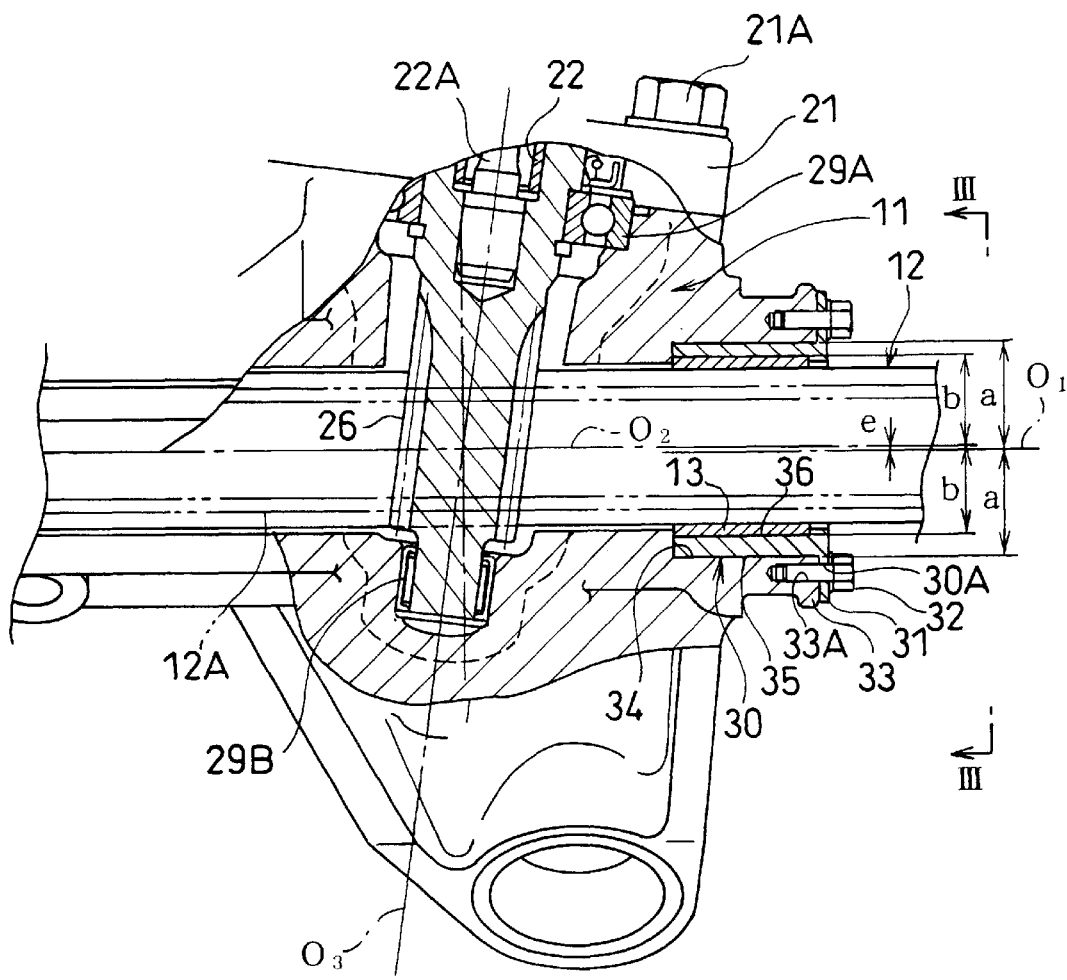
FIG. 2 is an enlarged partial cutaway side view of a portion of FIG. 1.
Figure 4:
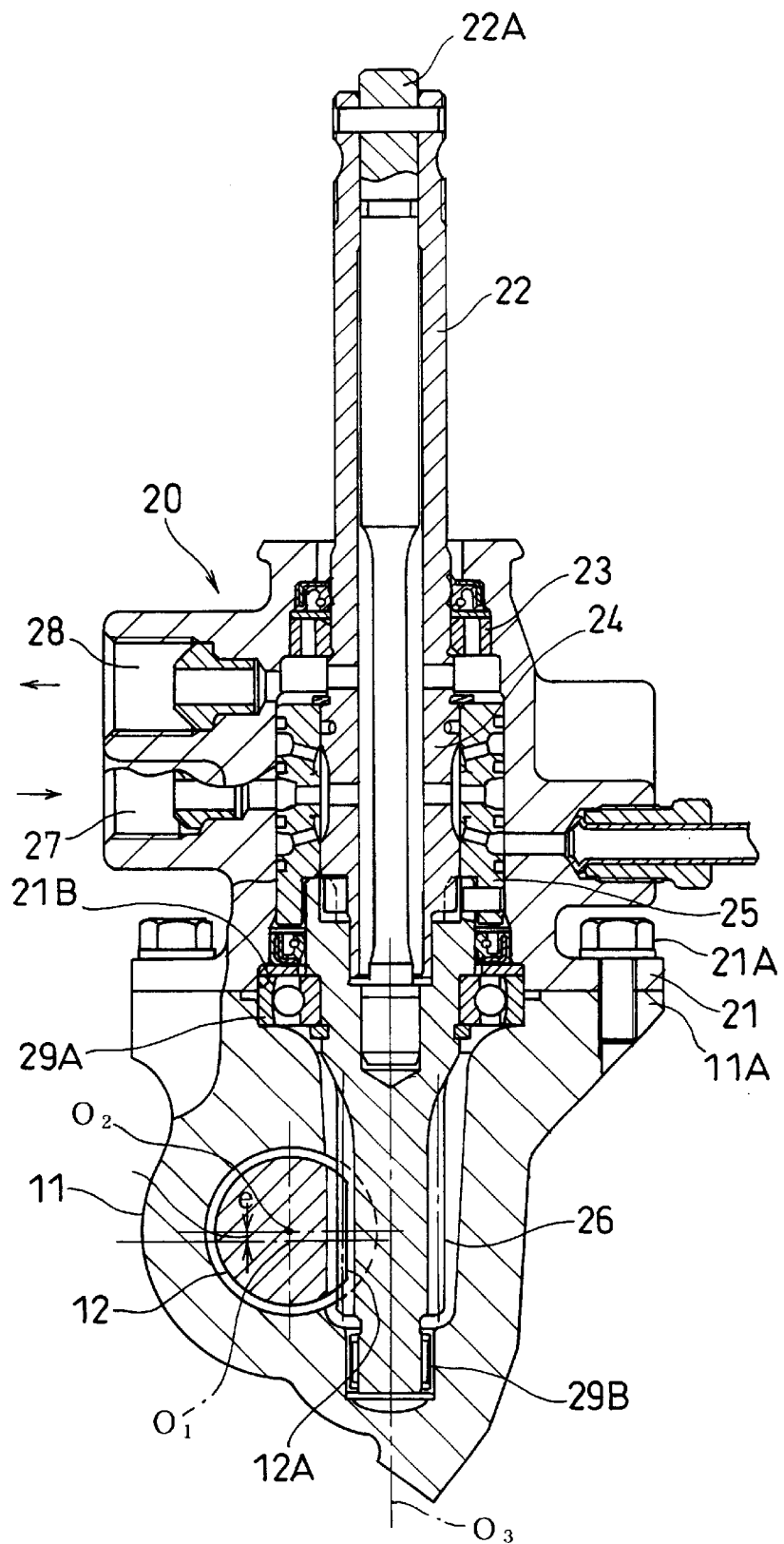
FIG. 4 is a section view taken along line IV—IV in FIG. 1.

As shown in FIG. 1, in a hydraulic power steering apparatus 10, a rack shaft 12 is supported by a gear housing 11 fixed to a vehicle body frame or the like by a bracket (not shown) so as to be linearly movable via a bush 13. A power cylinder 14 is provided, and a piston 15 is provided on a rack shaft 12 penetrating the power cylinder 14. Reference numerals 16A and 16B respectively denote a first chamber and a second chamber of the power cylinder 14, reference numeral 17 denotes an oil seal, and reference numeral 18 denotes a back-up ring. In the hydraulic power steering apparatus 10, left and right tie-rods (not shown) are coupled to the rack shaft 12 so that a steering force of a driver for steering a steering wheel is assisted In the power steering apparatus 10, a valve housing 21 of a control valve 20 is fixed to a flange 11A of the gear housing 11 by a bolt 21A. In the control valve 20, as shown in FIG. 4, a steering shaft 22 rotated according to rotation of the steering wheel is rotatably supported to the valve housing 21 via a bearing 23. A rotor 24 provided at the steering shaft 22 and a sleeve 25 fixed to a distal end portion of a torsion bar 22A fixed to the steering shaft 22 together with a pinion 26 are coaxially disposed to be moved relative to each other by a resilient torsion deformation of the torsion bar 22A responding to a steering torque applied to the steering wheel. A pump side supply flow path 27 and a tank side return flow path 28 are controllable to be switched between the first chamber 16A and the second chamber 16B of the power cylinder 14. Incidentally, the pinion 26 is rotatably supported by an upper bearing 29A supported by the valve housing 21 and the gear housing 11 and a lower bearing 29B supported by the gear housing 11, and is caused to mesh with rack teeth 12A of the rack shaft 12. Namely, the power steering apparatus 10 is for assisting steering force with rack propelling force obtained by feeding hydraulic oil from a pump to the power cylinder 14 via the control valve 20.

It should be noted that supporting centers of the steering shaft 22, the torsion bar 22A and the like supported by the valve housing 21 are set to be coaxial with a supporting center ($O_3$) of the pinion 26 supported by the gear housing 11. This coaxial setting can be achieved by supporting a portion of the upper bearing 29A supporting the pinion 26 and supported by the gear housing 11 to a supporting hole 21B of the valve housing 21 and coaxially fitting the steering shaft 22 and the torsion bar 22A to the pinion 26.

In the above structure, the power steering apparatus 10 is further provided with the following structure for adjusting meshing between the rack teeth 12A of the rack shaft 12 and the pinion 26.

The rack shaft 12 is supported by the gear housing 11 via a rack adapter 30. The rack adapter 30 supports the rack shaft 12 via a bush 13 such that the latter is linearly movable, and a flange 31 of the rack adapter 30 is fixed to a flange 33 of the gear housing 11 via screw holes 33A formed in the flange 33 by bolts 32.

Also, the rack adapter 30 includes a circular outer peripheral supporting portion 35 (having a diameter of $2a$) fitted in a supporting hole 34 formed in the gear housing 11 and supported by the gear housing 11, and a circular inner peripheral supporting portion 36 (having a diameter of $2b$) supporting the rack shaft 12 via the bush 13. In the rack adapter 30, a supporting center $O_2$ of the inner peripheral supporting portion 36 is positioned so as to be eccentric with respect to a supporting center $O_1$ of the outer peripheral supporting portion 35 by an amount of eccentricity e. The mounting hole 30A for the bolt 32 formed in the flange 31 of the rack adapter 30 is formed in a long hole shape so as to allow adjustment of mounting angle positions of the rack adapter 30 relative to the flange 33 of the gear housing 11 about the supporting center $O_1$ of the above outer peripheral supporting portion 35.

Figure 3:
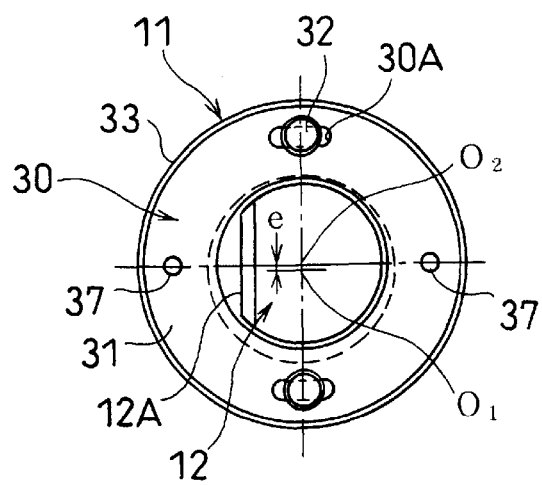
FIG. 3 is a end view taken along line III—III in FIG. 2.

Incidentally, tool fitting holes 37, 37 are provided at portions on the flange 31 of the rack adapter 30 which are opposed to each other in a diametrical direction (refer to FIG. 3). The above-mentioned mounting angle position of the rack adapter 30 can be adjusted by fitting two pins provided at a forked distal end portion of a tool (not shown) into the fitting holes 37, 37 and operating the tool in a rotating manner.

The following operations and effects can be obtained according to the present embodiment.

(1) The supporting center $O_1$ of the outer peripheral supporting portion 35 of the rack adapter 30 supported by the gear housing 11 and the supporting center $O_2$ of the inner peripheral supporting portion 36 of the rack adapter 30 supporting the rack shaft 12 are positioned to be eccentric to each other by the amount of eccentricity e. Accordingly, when the mounting angle position of the rack adapter 30 to the gear housing 11 is adjusted, the position of the center axis of the rack shaft 12 relative to the gear housing 11 is displaced due to presence of the above amount of eccentricity e. As a result, the meshing position of the rack shaft 12 with the pinion 26 whose supporting axis $O_3$ is fixed to the gear housing 11 can be adjusted Thereby, meshing between the rack teeth 12A of the rack shaft 12 and the pinion 26 can be set appropriately. Accordingly, steering operation can be improved without an increase in operation resistance of the rack shaft 12.

(2) Since the rack shaft 12 is supported by the rack adapter 30 which is supported by the gear housing 11 via the bush 13 or the like, no portion of the apparatus is available to cause striking noises.

Though the embodiment of the present invention has been described, a particular structure of the present invention is not limited to the embodiment. The structure of the present invention can be modified or changed within the spirit and/or scope of the present invention. For example, the present invention is applicable not only to a hydraulic power steering apparatus but also to an electromotive power steering apparatus.

As set forth above, according to the present invention, in a power steering apparatus, meshing between rack teeth of a rack shaft and a pinion can be set appropriately with the present structure where striking noises are not generated at a rack supporting portion.

Although the invention has been illustrated and described with respect to several exemplary embodiments thereof, it should be understood by those skilled in the art that the foregoing and various other changes, omissions and additions may be made to the present invention without departing from the spirit and scope thereof Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A power steering apparatus, comprising: a rack shaft supportable by a gear housing so as to be linear movable, a pinion connected to a steering shaft arranged and constructed to mesh with rack teeth of the rack shaft, the rack shaft being supportable by the gear housing via a rack adapter, the rack adapter having an outer peripheral supporting portion supportable by a supporting hole provided on the gear housing, and an inner peripheral supporting portion supporting an outer peripheral of the rack shaft, a supporting center to the inner peripheral supporting portion being disposed eccentrically to supporting center of the outer peripheral supporting portion, wherein a mounting angle position of the pinion adapter relative to the gear housing about the supporting center of the outer peripheral supporting portion is adjustable.

2. A power steering apparatus according to claim 1, wherein the rack shaft is supportable by the rack adapter via a bush so as to be linearly movable.

\* \* \* \* \*